United States Patent [19]

Funayama et al.

[11] Patent Number: 5,712,330
[45] Date of Patent: Jan. 27, 1998

[54] STYRENIC RESIN PELLET AND MOLDING PRODUCED THEREFROM

[75] Inventors: Michio Funayama; Hiroki Fukui, both of Ichihara, Japan

[73] Assignee: Idemitsu Petrochemical Co., Ltd., Tokyo, Japan

[21] Appl. No.: 652,463

[22] PCT Filed: Oct. 19, 1995

[86] PCT No.: PCT/JP95/02140

§ 371 Date: Jun. 14, 1996

§ 102(e) Date: Jun. 14, 1996

[87] PCT Pub. No.: WO96/12597

PCT Pub. Date: May 2, 1996

[30] Foreign Application Priority Data

Oct. 20, 1994 [JP] Japan ................................. 6-255070

[51] Int. Cl.⁶ ....................................................... C08K 9/04
[52] U.S. Cl. ........................................... 523/206; 523/207
[58] Field of Search ................................... 523/206, 207

[56] References Cited

U.S. PATENT DOCUMENTS 3,650,810  3/1972  Marzocchi .......................... 523/207
3,775,163  11/1973  Marzocchi .......................... 523/207
4,659,752  4/1987  Piret ..................................... 523/206

FOREIGN PATENT DOCUMENTS 0 501 625      9/1992  European Pat. Off. .
WO 94/24206  10/1994  WIPO .

*Primary Examiner*—Kriellion S. Morgan
*Attorney, Agent, or Firm*—Oblon, Spivak, McClelland, Maier & Neustadt, P.C.

[57] ABSTRACT

There is disclosed a styrenic resin pellet having a length in the range of 2 to 100 mm which comprises a (A) styrenic polymer having syndiotactic configuration and containing a polar group and at least 10% by weight of a (B) glass fiber which is surface-treated with a coupling agent, is impregnated with the styrenic polymer, and has a length equal to the length of the pellet. The styrenic resin pellet is imparted with excellent moldability and improved in general physical properties such as impact resistance and heat resistance, thereby making itself well suited to the raw material for producing molded articles excellent in practical characteristics such as tensile creep at elevated temperatures higher than the glass transition temperature and vibrational fatigue characteristics at elevated temperatures.

9 Claims, No Drawings

1

STYRENIC RESIN PELLET AND MOLDING PRODUCED THEREFROM

TECHNICAL FIELD

The present invention relates to a styrenic resin pellet and a molding produced therefrom. More particularly, it pertains to a styrenic resin pellet and a molding produced therefrom that are greatly improved in impact resistance as well as practical characteristics at elevated temperatures without losing the excellent heat resistance and high mechanical strength that are inherent in a styrenic resin having syndiotactic configuration.

BACKGROUND ART

Though a styrenic resin has heretofore been widely used in a variety of fields as a general-purpose resin, it has suffered the serious disadvantage of its inferior impact resistance in general. In order to improve the impact resistance of a styrenic polymer, there is industrially produced a so-called rubbery modified styrenic polymer, that is, a substantial mixture of a rubbery polymer/styrene graft copolymer and polystyrene in which a part of styrene is graft-polymerized onto a rubbery polymer and the remainder thereof constitutes polystyrene by a method in which styrene is blended with a rubbery polymer or a method in which styrene is polymerized in the presence of a rubbery polymer.

In addition, Japanese Patent Application Laid-Open No. 247292/1993 discloses that a styrenic resin composition is excellent in impact resistance and release properties from a hot mold, said composition comprising a styrenic polymer having high degree of syndiotactic configuration, a rubbery elastomer having a product of weight-average molecular weight and styrenic monomer unit content being at least 30,000 and a filler such as glass fiber. The above-mentioned styrenic polymer, although sufficiently improved in release properties from a hot mold, is not sufficiently improved in general physical-properties such as impact resistance and heat resistance, and in particular is inferior in practical characteristics such as creep at a high temperature higher than the glass transition temperature and vibrational fatigue.

DISCLOSURE OF THE INVENTION

It is an object of the present invention to provide a styrenic resin pellet usable as the raw material for a molding which is improved in general physical-properties such as impact resistance and heat resistance, and is excellent in practical characteristics such as tensile creep at a high temperature higher than the glass transition temperature and vibrational fatigue at a high temperature, while preserving the excellent moldability of the pellet.

As a result of intensive research and investigation accumulated by the present inventors in order to develop a styrenic resin pellet having favorable properties as mentioned above, the foregoing disadvantage has turned out to be caused by the fact that since the aforesaid conventional styrenic resion composition is prepared only by melt-kneading each of the components, glass fiber as a filler incorporated in the composition is broken off at the time of kneading. As a result of further research continued by the present inventors, it has been found that the above-mentioned object can be achieved by impregnating glass fiber with a styrenic polymer having syndiotactic configuration and containing a polar group and equalizing the lengths of a styrenic resin pellet and the glass fiber thus treated. The present invention has been accomplished by the above-mentioned finding and information.

Specifically, the present invention provides a styrenic resin pellet having a length in the range of 2 to 100 mm, preferably 5 to 50 mm which comprises a (A) styrenic polymer having syndiotactic configuration and containing a polar group; and at least 10% by weight, preferably 30 to 80% by weight of a (B) glass fiber which is surface-treated with a coupling agent, said glass fiber being impregnated with said styrenic polymer, and having a length equal to the length of said pellet.

The present invention further provides a styrenic resin pellet having a length in the range of 2 to 100 mm, preferably 5 to 50 mm which comprises a (C) styrenic polymer having syndiotactic configuration; a (D) rubbery elastomer having a product of weight-average molecular weight and styrenic monomer unit content being at least 30,000; at least one member selected from the group consisting of an (E) poly(phenylene ether) having a polar group, an (A) styrenic polymer having syndiotactic configuration and containing a polar group and a (F) rubbery elastomer having a polar group, in an amount of 0.1 to 60 parts by weight based on 100 parts by weight of the total sum of the components (C) and (D) and at least 10% by weight, preferably 30 to 80% by weight of a (B) glass fiber which is surface-treated with a coupling agent, said glass fiber being impregnated with the composition comprising the components (C), (D) and at least one selected from (E), (A) and (F), and having a length equal to the length of said pellet.

The present invention still further provides a molding made by molding the above-mentioned styrenic resin pellet as such or along with a styrenic polymer having syndiotactic configuration or a styrenic polymer having syndiotactic configuration which is reinforced with short fibers, wherein the content of the glass fiber having a length of at least 2 mm is at least 1% by weight based on the whole amount of the glass fiber.

THE MOST PREFERRED EMBODIMENT TO CARRY OUT THE INVENTION

The primary object of the present invention is to provide a styrenic resin pellet made by impregnating the component (B) with the component (A) in which the content of the glass fiber as the component (B) is at least 10% by weight, preferably 30 to 80% by weight, the pellet has a length of 2 to 100 mm, preferably 5 to 50 mm, and the glass fiber has a length equal to the length of said pellet.

In the styrenic resin pellet, a styrenic polymer which has syndiotactic configuration and contains a polar group is employed as the component (A). Here, the styrenic polymer which has syndiotactic configuration (hereinafter sometimes abbreviated to "SPS") means that its stereochemical structure is of syndiotactic configuration, that is, the stereostructure in which phenyl groups or substituted phenyl groups as side chains are located alternately at oppsite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly (ethylstyrenen), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly (fluorostyrene). Poly(halogenated alkylstyrene) includes poly(chloromethylstyrene). Poly(alkoxystyrene) includes poly(methoxystyrene) and poly(ethoxystyrene).

The molecular weight and molecular weight distribution of the SPS are not specifically limited, but may be determined according to the purpose of use of the composition to be produced and the like. In addition, the SPS has a melting point of 260° to 270° C. and has heat resistance surpassingly superior to that of the conventional styrenic polymer having a tactic configuration.

The component (A) of the present invention is the SPS made by modifying the above-mentioned SPS, and is obtained, for example, by (1) the introduction of a polar group through copolymerization reaction at the time of polymerization, (2) the introduction of a polar group at the time of ceasing polymerization reaction or (3) grafting by the use of the polar group in the preceding item (1) or (2) without specific limitation. Also the modification rate is not specifically limited.

Examples of the above-mentioned item (1) include the copolymer of styrene and p-methylstyrene or divinylbenzene, those of the item (2) include SPS which is terminal-modified with glycidyl methacrylate and SPS which is terminal-modified with maleic anhydride, and those of the item (3) include SPS produced by grafting glycidyl methacrylate onto the copolymer of styrene and divinylbenzene and SPS produced by grafting maleic anhydride onto the copolymer of styrene and p-methylstyrene in the presence of a radical generating agent.

Examples of such polar group include acid halide, carbonyl group, acid anhydride, acid amide, carbonic acid ester, acid azide, sulfone group, nitrile group, cyano group, isocyanic acid ester group, amino group, hydroxyl group, imide group, thiol group, oxazoline group and epoxy group, of which an acid anhydride is particularly desirable, among which maleic anhydride group is most desirable. The content of the polar group is not less than 0.01%, preferably not less than 0.1% by weight based on the SPS. A content thereof less than 0.01% by weight causes difficulty in enhancing the mechanical strength of the objective styrenic resin pellet.

There is used, as the component (B), glass fiber which is surface-treated with a coupling agent. The coupling agent may be optionally selected for use from the publicly known silane-based coupling agent and titanium-based coupling agent. Examples of the silane-based coupling agent include triethoxysilane; vinyltris(β-methoxyethoxy)silane; γ-methacryloxypropyltrimethoxysilane; γ-glycidoxypropyltrimethoxysilane; β-(1,1-epoxycyclohexyl)ethyltrimethoxysilane; N-β-(aminoethyl)-γ-aminopropyltrimethoxysilane; N-β-(aminoethyl)-γ-aminopropylmethyldimethoxysilane; γ-aminopropyltriethoxysilane; N-phenyl-γ-aminopropyltrimethoxysilane; γ-mercaptopropyltrimethoxysilane; γ-chloropropyltrimethoxysilane; γ-aminopropyltrimethoxysilane; γ-aminopropyl-tris(2-methoxy-ethoxy)silane; N-methyl-γ-aminopropyltrimethoxysilane; N-vinylbenzyl-γ-aminopropyltriethoxysilane; triaminopropyltrimethoxysilane; 3-ureidopropyltrimethoxy-silane; 3-4,5-dihydroimidazolepropyltriethoxysilane; hexamethyldisilazane; N,O-(bistrimethylsilyl)amide and N,N-bis (trimethylsilyl)urea. Among them are desirable aminosilane and epoxysilane such as γ-aminopropyl-triethoxysilane; N-β-(aminoethyl)-γ-aminopropyl-trimethyoxysilane; γ-glycidoxypropyltrimethoxysilane; β-(3,4-epoxycyclohexyl)ethyltrimethoxysilane. Among them the above-mentioned amino silanes are particularly desirable.

Specific examples of the titanium-based coupling agent include isopropyltriiisostearoyl titanate; isopropyltridodecylbenzenesulfonyl titanate; isopropyltris (dioctylpyrophosphate) titanate, tetraisopropylbis (dioctylphosphite)titanate; tetraoctylbis(di-tridecylphosphite)titanate; tetra(1,1-diallyloxymethyl-1-butyl)bis(di-tridecyl)phosphite titanate; bis (dioctylpyrophosphate)oxyacetate titanate; bis (dioctylpyrophosphate)ethylene titanate; isopropyltrioctanoyl titanate; isopropyldimethacrylisostearoyl titanate; isopropylisostearoyldi-acryl titanate; isopropyltri(dioctylphosphate) titanate; isopropyltricumylphenyl titanate; isopropyltri(N-amidoethyl, aminoethyl) titanate; dicumylphenyloxyacetate titanate and di-isostearoyl-ethylene titanate, among which isopropyltri (N-aminoethyl, aminoethyl) titanate is desirable.

The surface treatment of the above-mentioned glass fiber by the use of such coupling agent can be effected by a conventional known method without specific limitation, for example, sizing treatment in which the glass fiber is coated with the sizing agent in the form of solution of the coupling agent as mentioned above in an organic solvent or in the form of suspension containing the coupling agent.

Moreover, a film-forming substance for glass may be used in combination with the above-described coupling agent. This film-forming substance is not specifically limited, but is exemplified by polymers such as polyester, polyurethane, epoxy polymer, acrylic polymer, poly(vinyl acetate) and isocyanate-based polymer.

Glass fiber roving is preferably used in impregnating glass fiber with the component (A). The number of single yarns which forms glass roving is usually 1,000 to 3,000, and the single yarns are preferably free from twist.

Preferable impregnation methods are exemplified by a method in which glass fiber roving is opened with an opening roll while being allowed to travel continuously, and thereafter the opened fiber is brought into contact with molten resin to stick the resin to the glass fiber. In this method, the glass fiber is sufficiently disassembled, thereby facilitating the adhesion and impregnation of the resin on and into the filaments, piece by piece which constitute the glass fiber roving.

There are adoptable, as methods for the adhesion and impregnation of the resin, a method in which glass fiber roving is immersed in the molten resin and passed therethrough; a method in which glass fiber roving is passed through a coating die; a method in which the molten resin is extruded around the glass fiber roving by the use of a die; and the like method. In order to further improve the impregnation of the resin into the roving as well as the wettability of the roving by the resin, it is particularly preferable that the impregnation method be incorporated with the steps of drawing under tension, the roving onto which the molten resin is stuck by providing unevenness in a die, and pressing the roving with a pressure roll.

The long fiber-reinforced resin composition in the form of rope or tape thus obtained as such or after being formed into a rope, is cooled and then cut off into pellets with an appropriate length, thereby producing resin pellets having a length equal to the length of the glass fiber.

In the present invention, the resin composition is cut into pellets having a length in the range of 2 to 100 mm, preferably 5 to 50 mm. Accordingly, the lengths of the glass fiber and the pellets are equalized to 2 to 100 mm. A length of the glass fiber less than 2 mm leads to insufficient improvement in mechanical strength and impact strength, whereas that more than 100 mm unfavorably causes liability to separation at the time of molding, variability or dispersion in physical properties and poor penetration at the time of molding.

In the styrenic resin pellet according to the present invention, the content of the glass fiber as the component (B) is not less than 10%, preferably 30 to 80% by weight. A content thereof less than 10% by weight results in failure to sufficiently manifest the strength, rigidity and impact strength in a molding produced by injection molding of the resin pellet.

The second object of the present invention is to provide a styrenic resin pellet having a length in the range of 2 to 100 mm, preferably 5 to 50 mm which comprises a (C) styrenic polymer having syndiotactic configuration; a (D) rubbery elastomer having a product of weight-average molecular weight and styrenic monomer unit content being at least 30,000; at least one member selected from the group consisting of an (E) poly(phenylene ether) having a polar group, an (A) styrenic polymer having syndiotactic configuration and containing a polar group and a (F) rubbery elastomer having a polar group, in an amount of 0.1 to 60, preferably 1 to 20 parts by weight based on 100 parts by weight of the total sum of the components (C) and (D) and at least 10% by weight, preferably 30 to 80% by weight of a (B) glass fiber which is surface-treated with a coupling agent, said glass fiber being impregnated with the composition comprising the components (C), (D) and at least one selected from (E), (A) and (F) and having a length equal to the length of said pellet.

The SPS to be used as the component (C) is exemplified by those same as the SPS described in detail hereinbefore in the foregoing component (A) as the SPS prior to the introduction of a polar group.

On the other hand, the component (D), that is, the rubbery elastomer having a product of weight-average molecular weight and styrenic monomer unit content being at least 30,000 has a styrenic monomer unit and is exemplified by styrene/butadiene block copolymer rubber, styrene/butadiene block copolymer rubber in which the butadiene moiety is hydrogenated in part or in whole, styrene/butadiene copolymer rubber, methyl acrylate/butadiene/styrene copolymer rubber, acrylonitrile/butadiene/styrene copolymer rubber and methyl acrylate/acrylic acid/2-ethylhexyl/styrene copolymer rubber. Due to the styrenic unit, any of the above-exemplified rubbery polymers has favorable dispersibility in the styrenic polymer having syndiotactic configuration as the component (C) and consequently is remarkably improved in physical properties. The particularly suitable one among them is styrene/butadiene block copolymer in which the butadiene moiety is hydrogenated by at least 95%. A degree of its hydrogenation less than 95% leads to insufficiency in long-term heat resistance of the composition to be produced, thereby causing possibility of coloration or deterioration of the physical properties thereof.

In the rubbery elastomer as the component (D) in the present invention, the product of weight-average molecular weight (Mw) and styrenic monomer unit content is at least 30,000, preferably at least 40,000. A product thereof less than 30,000 results in insufficient release properties and rigidity as well as inferior heat resistance.

The polar group in the poly(phenylene ether) having a polar group as the component (E) is exemplified by acid halide, carbonyl group, acid anhydride, acid amide, carbonic acid ester, acid azide, sulfone group, nitrile group, cyano group, isocyanic acid ester group, amino group, hydroxyl group, imide group, thiol group, oxazoline group and epoxy group, of which an acid anhydride is particularly desirable, among which maleic anhydride group is most desirable. The content of the polar group is preferably 0.01% or more by weight based on the poly(phenylene ether) without specific limitation. A content thereof less than 0.01% by weight causes difficulty in enhancing the mechanical strength of the styrenic resin pellet.

The polyphenylene ether having a polar group can be produced, for example, by (1) a method wherein a polyphenylene ether is reacted with a compound having both the above-mentioned polar group and an unsaturated group, (2) a method wherein at least one phenolic compound having the above-mentioned polar group is polymerized, (3) a method wherein at least one phenolic compound having the above-mentioned polar group is polymerized with a phenolic compound not having a polar group or the like method.

A polyphenylene ether is a publicly known compound in itself (refer to U.S. Pat. Nos. 3,306,874, 3,306,875, 3,257,357 and 3,257,358), and is produced usually by oxidative coupling reaction forming a homopolymer or a copolymer in the presence of a cupramine complex and at least one di-or-tri-substituted phenol. As the cupramine complex, there may be employed the cupramine complex derived from any of primary, secondary and tertiary amines.

Specific examples of the suitable polyphenylene ether include poly(2,3-dimethyl-6-ethyl-1,4-phenylene ether), poly(2-methyl-6-chloromethyl-1,4-phenylene ether), poly(2-methyl-6-hydroxydiethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether). Other suitable examples of the polyphenylene ether include a copolymer derived from at least two phenolic compounds that are used for the preparation of the above-mentioned homopolymer and a graft copolymer or a block copolymer of an aromatic vinyl compound such as styrene and the aforestated polyphenylene ether. Among the above-mentioned polyphenylene ether, poly(2,6-dimethyl-1,4-phenylene ether) is particularly desirable for use.

The above-mentioned compound having both a polar group and an unsaturated group is a compound having in the same molecule both an unsaturated group such as carbon-carbon double bond and carbon-carbon triple bond, and a polar group such as carboxyl group, a group derived from a carboxylic acid exemplified by various salts and esters formed by replacement of hydrogen atom or hydroxyl group of carboxyl group, acid amide, acid anhydride, imide, acid azide, halogenated acid, oxazoline, nitrile, epoxy group, amino group, hydroxyl group and isocyanic acid ester.

Major examples of the compound having both a polar group and an unsaturated group include unsaturated carboxylic acid, derivative thereof, unsaturated epoxy compound, unsaturated alcohol, unsaturated amine and unsatureated isocyanic acid ester, specifically exemplified by maleic anhydride, maleic acid, fumaric acid, maleimide, maleic hydrazide and a reaction product of maleic acid and diamine represented by, for example, the general formula

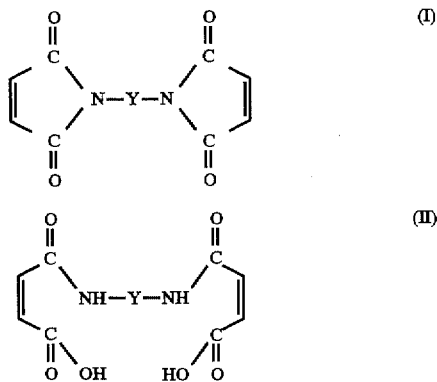

wherein Y is an aliphatic or aromatic group, methylnadic anhydride, dichloromaleic anhydride; maleic amide; iraconic acid; and iraconic anhydride, natural fat and oil such as soybean oil; tung oil; castor oil; linseed oil; hempseed oil; cotton seed oil; sesame oil; rapeseed oil; peanut oil; camellia oil; olive oil; coconut oil; and sardine oil, unsaturated carboxylic acid such as acrylic acid; butenoic acid; crotonic acid; vinylacetic acid; methacrylic acid; pentenoic acid; angelic acid; thebenolic acid; 2-pentenoic aicd; 3-pentenoic acid; α-ethylacrylic acid; β-methylcrotonic acid; 4-pentenoic acid; 2-hexenoic acid; 2-methyl-2-pentenoic acid; 3-methyl-2-pentenoic acid; α-ethylcrotonic acid; 2,2-dimethyl-3-butenoic acid; 2-heptenoic acid; 2-octenoic acid; 4-decenoic acid; 9-undecenoic acid; 10-undecenoic acid; 4-dodecenoic acid; 5-dodecenoic acid; 4-tetradecenoic acid; 9-tetradecenoic acid; 9-hexadecenoic acid; 2-octadecenoic acid; 9-octadecenoic acid; eicosenoic acid; docosenoic acid; erucic acid; tetracosenoic acid; myelibainic acid; 2,4-pentadienoic acid; 2,4-hexadienoic acid; diallylacetic acid; geranic acid; 2,4-decadienoic acid; 2,4-dodecadienoic acid; 9,12-hexadecadienoic acid; 9,12-octadecadienoic acid; hexadecatriolefinic acid; linolic acid; linolenic acid; octadecatriolefinic acid; eicosadienoic acid; eicosatriolefinic acid; eicosatetraolefinic acid; ricinolic acid; eleostearic acid; oleic acid; eicosapentaenoic acid; erucinoic acid; docosadienoic acid; docosatriolefinic acid; docosatetraolefinic acid; docosapentaenoic acid; tetracosenoic acid; hexacosenoic acid; hexacodienoic acid; octacosenoic acid; and tetracosenoic acid, and esters thereof, acid amide thereof, anhydride thereof, unsaturated alcohol such as allyl alcohol; crotyl alcohol; methylvinyl carbinol; allyl carbinol; methylpropenyl carbinol; 4-pentene-1-ol; 10-undecane-1-ol; proparyl alcohol; 1,4-pentadiene-3-ol; 1,4-hexadiene-3-ol; 3,5-hexadiene-2-ol; 2,4-hexadiene-1-ol; alcohol represented by the general formula $C_nH_{2n-5}OH$, $C_nH_{2n-7}OH$ or $C_nH_{2n-9}OH$ wherein n denotes a positive integer; 3-butene-1,2-diol; 2,5-dimethyl-3-hexene-2,5-diol; 1,5-hexadiene-3,4-diol; and 2,6-octadiene-4,5-diol, unsaturated amine derived from unsaturated alcohol by substituting $NH_2$ group for OH group, adduct of low polymer, e,g. with an average molecular weight of 500 to 10000, approx, or adduct of high polymer, e,g. with an average molecular weight of 10,000 or more derived from butadiene, isoprene, etc. with maleic anhydride, phenols or the like; above adduct into which amino group; carboxyl group; hydroxyl group, epoxy group or the like is introduced; and allyl isocyanate.

Examples of vinyl compound having an epoxy group include glycidyl methacrylate; glycidyl acrylate; vinylglycidyl ether;glycidyl ether of hydroxyalkyl (meth)acrylate; glycidyl ether of polyalkyleneglycol (meth)acrylate and glycidyl itaconate, of which glycidyl methacrylate is particularly desirable.

The method of reacting the compound having both a polar group and an unsaturated group with the above-mentioned polyphenylene ether is exemplified by (1) a method wherein a compound having both a polar group and an unsaturated group and a polyphenylene ether are melt-kneaded at a temperature of 150° to 350° C. by the use of a roll mill, a Banbury mixer, an extruder or the like to allow them to react with each other and (2) a method wherein a polyphenylene ether and a compound having both a polar group and an unsaturated group are reacted by heating in a solvent such as benzene, toluene and xylene. It is effective for ready proceeding of the reaction to allow an organic peroxide such as benzoyl peroxide, di-tert-butyl peroxide, dicumyl peroxide and tert-butylperoxybenzoate and/or a radical reaction initiator typified by an azo compound such as azobis (isobutyronitrile) and azobis(isovaleronitrile) to exist in the raction system. More effective method is a method by melt kneading the components in the presence of a radical reaction initiator.

The rubbery elastomer having a polar group as the component (F) is used for the purpose of improving the impact resistance of the styrenic resin pellet of the present invention. A variety of such rubbery elastomers may be used, and exemplified by polysulfide rubber, thiokol rubber, acrylic rubber, urethane rubber, epichlorohydrin rubber, chlorinated rubber, styrene/butyl-acrylate rubber, ethylene/polar vinyl monomer copolymer-rubber such as ethylene/methyl methacrylate/glycidyl methacrylate copolymer rubber, and ethylene/methyl methacrylate/maleic anhydride copolymer rubber; a rubber obtained by modifying, with a modifying agent having a polar group, natural rubber; polybutadiene; polyisoprene; polyisobutyrene; neoprene; silicone rubber; styrene/butadiene block copolymer (SBR); a styrene/butadiene/styrene block copolymer (SBS); hydrogenated styrene/butadiene/styrene block coppolymer (SEBS); styrene/isoprene block copolymer (SIR); styrene/isoprene/ styrene block copolymer (SIS); hydrogenated styrene/ isoprene/styrene block copolymer (SEPS); ethylene/ propylene rubber (EPM); ethylene/propylene/diene rubber (EPDM); and ethylene/butylene rubber (EBM) and the like. Preferable rubbery elastomers among them are those obtained by modifying SEBS, SBR, SBS, SEPS or SIS. The above-mentioned rubbery elastomer having a polar group may be used alone as a single species or in combination with at least one other species.

The polar group is not specifically limited but is exemplified by acid halide, carbonyl group, acid anhydride, acid amide, carbonic acid ester, acid azide, sulfone group, nitrile group, cyano group, isocyanic acid ester group, amino group, hydroxyl group, imide group, thiol group, oxazoline group and epoxy group, of which an acid anhydride is particularly desirable, among which maleic anhydride group and epoxy group are most desirable. The content of the polar group is preferably 0.1% or more by weight based on the rubbery elastomer having a polar group. A content thereof less than 0.1% by weight causes difficulty in enhancing the mechanical strength of the styrenic resin pellet.

As the rubbery elastomer having a polar group, there is preferably used SEBS having both maleic anhydride group and epoxy group.

With regard to the resin components in the aforestated resin pellet according to the present invention, at least one component selected from among the components (E), (A) and (F) is blended in the resin composition in an amount of 0.1 to 60, preferably 1 to 20 parts by weight based on 100 parts by weight of the total sum of the components (C) and (D). An amount of at least one component selected from among the components (E), (A) and (F) being less than 0.1 part by weight brings about the problem of insufficient improvement in mechanical strength of the resultant resin pellet, whereas that more than 60 parts by weight gives rise to the disadvantage in that crystallization rate at the time of dilution molding is lowerd, thereby causing decrease in productivity of the pellet due to increase in the cooling time.

In the case of producing the styrenic resin pellet according to the present invention, the above-mentioned resin components are dry-blended in a prescribed blending ratio and pelletized, and the resultant pellet is impregnated in the glass fiber as the component (B) in the same manner as in the primary object of the present invention.

Any of the resin pellet produced by impregnating the component (B) with the component (A) and the resin pellet produced by impregnating the component (B) with the resin composition comprising 100 parts by weight of the sum of the components (C) and (D) and 0.1 to 60, preferably 1 to 20 parts by weight of at least one component selected from among the components (E), (A) and (F), may be incorporated, in addition to the above-mentioned indispensable components, with a flame retardant, a flame retardant aid and a filler surface-treated with a coupling agent and besides, PA, PBT, PPT and the like along with SPS as an alloy or admixture.

There are available a variety of flame retardants, among which are preferable in particular, a halogen-based flame retardant and a phosphorus-based flame retardant. Examples of the halogen-based flame retardant include tetrabromobisphenol A; tetrabromophthalic anhydride; hexabromobenzene; tribromophenylallyl ether; pentabromotoluene; pentabromophenol; tribromophenyl-2,3-dibromopropyl ether; tris(2,3-dibromopropyl)phosphate; tris(2-chloro-3-bromopropyl)phosphate; octabromodiphenyl ether; decabromodiphenyl ether; octabromobiphenyl; pentachloropentacyclodecane; hexabromocyclododecane; hexachlorobenzene; pentachlorotoluene; hexabromobiphenyl decabromobiphenyl; tetrabromobutane; decabromodiphenyl ether; hexabromodiphenyl ether; ethylenebis (tetrabromophthal-imide); tetrachlorobisphenol A; tetrabromobisphenol A; an oligomer of tetrachlorobisphenol A or tetrabromobisphenol A; halogenated polycarbonate oligomer such as brominated polycarbonate oligomer; halogenated epoxy compound; polychlorostyrene; brominated polystyrene such as poly(tribromostyrene); poly (dibromophenylene oxide); and bis(tribromophenoxy) ethane.

Aside therefrom, examples of the phosphorus-based flame retardant include ammonium phosphate, tricresyl phosphate, triethyl phosphate, acidic phosphoric acid ester and triphenyl-phosphone oxide. The particularly preferable examples among them are poly(tribromostyrene), poly (dibromophenylene oxide), decabromodiphenyl ether, bis (tribromophenoxy)ethane, ethylenebis (tetrabromophthalimide), tetrabromobisphenol A and brominated polycarbonate oligomer.

Examples of the flame retardant aid include antimony-based flame retardant aid such as antimony trioxide, antimony pentaoxide, sodium antimonate, metallic antimony, antimony trichloride, antimony pentachloride, antimony trisulfide and antimony pentasulfide and futher, zinc borate, barium metaborate and zirconium oxide, of which antimony trioxide is preferable.

The filler which is surface-treated with a coupling agent is not specifically limited in its form or shape, but may be in the form of fiber, granule or powder. Examples of fibrous filler include glass fiber, carbon fiber, organic synthetic fiber, whisker, ceramics fiber, metallic fiber and natural vegetable fiber. Specific examples of the filler include totally aromatic polyamide fiber and polyimide fiber as organic synthetic fiber, boron; alumina; silica; and silicon carbide as whisker, gypsum; potassium titanate; magnesium sulfate; and magnesium oxide as ceramics fiber, copper; aluminum; and steel as metallic fiber. Among them are particularly desirable glass fiber and carbon fiber. The form or shape of the filler includes cloth, mat, bound and cut fiber, short fiber, filament and whisker. The bound and cut fiber has preferably a length of 0.05 to 50 mm and a diameter of 5 to 20 µm. As carbon fiber, that of polyacrylonitrile-based (PAN) is preferable.

Examples of granular or powdery filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaokin, silicon carbide, metallic powder, glass powder, glass flake and glass bead. Among them, talc, calcium carbonate and mica are preferable in particular. Talc has desirably an average grain size of 0.3 to 20 µm, more desirably 0.6 to 10 µm. Calcium carbonate has desirably an average grain size of 0.1 to 20 µm. Mica has desirably an average grain size of 40 to 250 µm, more desirably 50 to 150 µm. Particularly desirable fillers among them include glass filler such as glass powder, glass flake, glass beads, glass filament, glass fiber, glass roving and glass mat.

The coupling agent to be used for the surface treatment of the aforesaid filler is exemplified by those same as the coupling agents described in detail hereinbefore to be used for the surface treatment of the glass fiber as the component (B).

The styrenic resin pellet of the present invention may be incorporated as necessary with an additive such as a stabilizer, antioxidant, light stabilizer, lubricant, plasticizer, antistatic agent, mold release agent, colorant or the like insofar as the object of the present invention is not impaired.

The third object of the present invention is to provide a molding excellent in a variety of characteristics by the use of the styrenic resin pellet of the present invention. The molding according to the present invention is obtained by molding the styrenic resin pellet as such or after being blended with SPS or single yarn-reinforced SPS, through any of various molding methods such as injection molding, extrusion molding, press molding or the like.

In the molding according to the present invention, the content of the glass fiber having a length of not less than 2 mm is at least 1%, preferably at least 5% by weight based on the whole amount of the glass fiber. A content of the glass fiber having a length of not less than 2 mm being less than 1% by weight results in failure to produce a molding excellent in impact resistance, heat resistance and physical properties at elevated temperatures.

In the following, the present invention will be described in more detail with reference to working examples, which however, shall not limit the present invention thereto. In the working examples, each of the properties was determined by the following manner.

(1) Izod impact strength with or without notch determined according to JIS K-7110
(2) Heat distortion temperature determined according to JIS K-7207
(3) Falling ball impact strength determined according to JIS K-7211
(4) Tensile creep (at 120° C.) determined according to JIS K-7115
(5) Vibrational fatigue strength determined by the strength leading at last to destruction after $10^6$ cycles according to JIS K-7118.

REFERENCE EXAMPLE 1

In a 500 mL (milliliter) glass vessel which had been purged with argon were placed 200 mL of toluene, 17.8 g (71 mmol) of copper sulfate pentahydrate ($CuSO_4$ $5H_2O$) and 24 mL (250 mmol) of trimethylaluminum, which were then reacted at 40° C. for 8 hours. Then, the solids were separated from the reaction mixture and the toluene was distilled away from the solution as obtained above at room temperature under reduced pressure to obtain 6.7 g of a contact product. The molecular weight thereof as determined by the freezing point depression method was 610.

PREPARATION EXAMPLE 1

(Preparation of SPS as the component (C))

In a 2 L (L=liter) reaction vessel were placed 1 L of purified styrene, the contact product as obtained in the above Reference Example 1 in an amount of 7.5 mmol as aluminum atom, 7.5 mmol of triisobutylaluminum and 0.038 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 466 g of polymer. As the result of analysis by gel permeation chromatography using 1,2,4-trichlorobenzene at 130° C. as the slovent, the polymer thus produced had a weight-average molecular weight of 290,000 and a ratio of weight-average molecular weight to number-average molecular weight of 2.72.

It was confirmed that the polymer was polystyrene having syndiotactic configuration (SPS) from the results of melting point measurement and $^{13}C$-NMR analysis.

PREPARATION EXAMPLE 2

(Preparation of poly(phenylene ether) having a polar group as the component (E))

500 g of SPS as obtained in Preparation Example 1, 500 g of poly(phenylene ether) (produced by Mitsubishi Gas Chemical Co., Inc. under the tradename "YPX-100L"), 33 g of maleic anhydride (grade S, produced by Wako Pure Chemical Industries Ltd.) and 20 g of 2,3-dimethyl-2,3-diphenylbutane as the radical generating agent (produced by Nippon Oil & Fats Co., Ltd. under the tradename "NOPH-MER BC") were mixed with a Henschel mixer. Subsequently the mixture was kneaded under heat-melting at 300° to 320° C. by means of a twin-screw extruder to afford maleic anhydride-modified poly(phenylene ether) (hereinafter sometimes abbreviated to "MA-PPO"), which was dissolved in toluene and then added dropwise into methanol to purify the same by reprecipitation. The purified MA-PPO was press molded and the resultant molding was observed for the peak assigned to carbonyl group by infrared (IR) analysis. As a result, the molding was confirmed to have been maleic anhydride-modified.

PREPARATION EXAMPLE 3

(Preparation of SPS having a polar group as the component (A))

100 Parts by weight of SPS in the Reference Example 1, 3 parts by weight of maleic anhydride and one part by weight of 2,3-dimethyl-2,3-diphenylbutane (produced by Nippon Oil & Fats Co., Ltd. under the tradename "NOPH-MER BC") were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride-modified SPS (hereinafter sometimes abbreviated to "MA-SPS").

In order to measure the modification rate, 1 g of the resultant modified SPS (MA-SPS) was dissolved in chloroform and thereafter reprecipitated in methanol, and the recovered polymer was subjected to Soxhlet extraction using methanol and dried. The modifiaction rate was determined from the intensity of carbonyl absorption in infrared (IR) absorption spectrum. As a result, the polymer was confirmed to have been maleic anhydride-modified.

PREPARATION EXAMPLE 4

(Preparation of rubbery elastomer having a polar group as the component (F))

1000 g of SEBS (produced by Shell Chem. Co. under the tradename Kraton G-1651) and 30g of maleic anhydride were dry-blended and melt kneaded by the use of a 30 mm twin-screw extruder at a revolution of 200 rpm at a temperature set to 300° C., to produce maleic anhydride-modified SEBS (hereinafter sometimes abbreviated to "MA-SEBS").

In order to measure the modification rate, the resultant modified SEBS (MA-SEBS) was dissolved in Chloroform and thereafter reprecipitated in methanol, and the recovered polymer was subjected to Soxhlet extraction using methanol and dried. The modifiaction rate was determined from the intensity of carbonyl absorption in infrared (IR) absorption spectrum and by neutralizing titration. As a result, the modification rate of the resultant MA-SEBS was 0.8% by weight.

EXAMPLES 1 TO 6 AND COMPARATIVE EXAMPLES 1 TO 2

Each of the resin compositions with blending proportion as given in Table 1 was dry-blended and melt kneaded by the use of a twin-screw extruder to pelletize the same. The glass fiber (produced by Asahi Fiber Glass Co., Ltd. under the tradename "ER 1150 FT 582") with blending proportion as given in Table 1 was impregnated with the above-obtained pellet. The mixture was molded by draw molding into molded article, which was cut off into pellets having a length as shown in Table 1 to produce styrenic resin pellet.

The alloy or admixture used as other component in Example 6 was PA66 2015B produced by Ube Industries Ltd.

TABLE 1-1

| Examples and Comparative Examples | Blend of resin components | | | |
|---|---|---|---|---|
| | (C) SPS (Parts) | (D) SEBS (Parts) | (E) MA-PPO (Parts) | (A) MA-SPS (Parts) |
| Example 1 | | | | 100 |
| Example 2 | 79 | 15 | 6 | |
| Example 3 | 87 | 10 | 2 | |
| Comparative Example 1 | 91 | 5 | 4 | |
| Comparative Example 2 | 88 | 10 | 2 | |
| Example 4 | 76 | 20 | 2 | 2 |
| Example 5 | 90 | 5 | 3 | |
| Example 6 | 44 | | 6 | |

TABLE 1-2

| Examples and Comparative Examples | Blend of resin components | | | |
|---|---|---|---|---|
| | (F) MA-SEBS (Parts) | Other Component PA66 (Parts) | (B) Glass fiber (wt %) | Pellet length (mm) |
| Example 1 | | | 60 | 9 |
| Example 2 | | | 60 | 6 |
| Example 3 | | | 60 | 12 |
| Comparative Example 1 | | | 5 | 8 |
| Comparative Example 2 | | | 50 | 150 |
| Example 4 | | | 60 | 8 |
| Example 5 | 2 | | 55 | 8 |
| Example 6 | | 50 | 60 | 8 |

EXAMPLES 7 TO 15 AND COMPARATIVE EXAMPLES 3 TO 6

By the use of the resin pellet produced in the foregoing examples and comparative examples, and in some cases, after diluting the resin pellet with the diluting component as given in Table 2, there were produced, by injection molding, moldings each containing glass fiber with blending proportion as given in Table 2. The glass single yarn-reinforced SPS used for dilution was SPS which was incorporated, with the glass fiber surface-treated with aminosilane (produced by Asahi Fiber Glass Co., Ltd. abbreviated to "03 JA FT-712") as the filler. PA alloy was a GF-reinforced alloy comprising SPS and PA as principal components.

Measurements were made of the general physical properties of the moldings thus obtained (Izod impact strength, heat distortion temperature and falling ball impact strength) and also of the physical properties for practical application of the same at 120° C. (tensile creep and vibrational fatigue strength). The results obtained are given in Table 3.

TABLE 2-1

| Examples and Comparative Examples | Blend | | | |
|---|---|---|---|---|
| | Resin kind | pellet (wt %) | dilution component | |
| | | | SPS (wt %) | GF-SPS (wt %) | PA alloy (wt %) |
| Example 7 | Example 1 | 50 | 50 | | |
| Example 8 | Example 2 | 33 | 67 | | |
| Example 9 | Example 2 | 50 | 50 | | |
| Example 10 | Example 3 | 100 | — | | |
| Example 11 | Example 3 | 50 | 50 | | |
| Comparative Example 3 | Comparative Example 1 | 5 | — | | |
| Comparative Example 4 | Comparative Example 2 | 60 | 40 | | |
| Example 12 | Example 3 | 5 | — | 95 | |
| Comparative Example 5 | | — | — | 100 | |
| Example 13 | Example 4 | 50 | 50 | | |
| Example 14 | Example 5 | 55 | 45 | | |
| Example 15 | Example 6 | 33 | — | | 67 |
| Comparative Example 6 | | — | — | | 100 |

TABLE 2-2

| Examples and Comparative Examples | Molding | |
|---|---|---|
| | total GF amount (wt %) | Percentage of GF having ≥ 2 mm length in total GF amount (wt %) |
| Example 7 | 30 | 58 |
| Example 8 | 20 | 45 |
| Example 9 | 30 | 40 |
| Example 10 | 60 | 60 |
| Example 11 | 30 | 40 |
| Comparative Example 3 | 5 | 52 |
| Comparative Example 4 | 30 | 67 |
| Example 12 | 31 | 7 |
| Comparative Example 5 | 30 | 0 |
| Example 13 | 30 | 36 |
| Example 14 | 30 | 38 |
| Example 15 | 40 | 29 |
| Comparative Example 6 | 30 | 0 |

TABLE 3-1

| Examples and Comparative Examples | Izod impact strength (kJ/m$^2$) | Heat distortion temperature (°C.) | Falling ball impact strength (N) |
|---|---|---|---|
| Example 7 | 14.6 | 263 | 1190 |
| Example 8 | 13.0 | 262 | 1130 |
| Example 9 | 19.0 | 263 | 1630 |
| Example 10 | 18.7 | 264 | 1710 |
| Example 11 | 19.7 | 258 | 1700 |
| Comparative Example 3 | 5.0 | 240 | 500 |
| Comparative Example 4 | Stable molding unproducible | | |
| Example 12 | 12.0 | 253 | 940 |
| Comparative Example 5 | 8.8 | 249 | 1100 |
| Example 13 | 13.9 | 263 | 1530 |

TABLE 3-1-continued

| Examples and Comparative Examples | Izod impact strength (kJ/m$^2$) | Heat distortion temperature (°C.) | Falling ball impact strength (N) |
|---|---|---|---|
| Example 14 | 14.8 | 263 | 1470 |
| Example 15 | 21.0 | 255 | 1860 |
| Comparative Example 6 | 10.5 | 242 | 900 |

TABLE 3-2

| Examples and Comparative Examples | Tensile creep, 200 kg/cm$^2$ × 1000 hr (%) | Vibrational fatigue strength leading to destruction after 10$^6$ cycles (kg/cm$^2$) |
|---|---|---|
| Example 7 | 1.00 | 74 |
| Example 8 | 1.10 | 65 |
| Example 9 | 1.23 | 70 |
| Example 10 | 1.42 | 70 |
| Example 11 | 1.40 | 70 |
| Comparative Example 3 | 2.0 | 30 |
| Comparative Example 4 | — | — |
| Example 12 | 2.5 | 53 |
| Comparative Example 5 | 4.25 | 40 |
| Example 13 | 1.07 | 71 |
| Example 14 | 1.00 | 69 |
| Example 15 | 0.26 | 90 |
| Comparative Example 6 | 0.50 | 80 |

INDUSTRIAL APPLICABILITY

The styrenic resin pellet according to the present invention can provide moldings that are not only improved in impact resistance and heat resistance but also excellent in characteristics at elevated temperatueres above the glass transition temperature such as tensile creep, vibrational fatigue characteristics, etc. at elevated temperatures, while substantially preserving the properties inherent in styrenic polymer having syndiotactic configuration as a crystalline polymer, thus making itself well suited to the production of moldings excellent in various properties.

We claim:

1. A styrenic resin pellet comprising a (A) styrenic polymer having syndiotactic configuration and containing a polar group and at least 10% by weight of a (B) glass fiber which is surface treated with coupling agent, wherein said styrenic resin pellet has a length in the range of 2 to 100 mm, and wherein said glass fiber is impregnate with said styrenic polymer and has a length equal to the length of said pellet.

2. The styrenic resin pellet according to claim 1 wherein the content of said glass fiber is in the range of 30 to 80% by weight.

3. A styrenic resin pellet having a length in the range of 2 to 100 mm which comprises a (C) styrenic polymer having syndiotactic configuration; a (D) rubbery elastomer having a product of weight-average molecular weight and styrenic monomer unit content being at least 30,000; at least one member selected from the group consisting of an (E) poly (phenylene ether) having a polar group, an (A) styrenic polymer having syndiotactic configuration and containing a polar group and a (F) rubbery elastomer having a polar group, in an amount of 0.1 to 60 parts by weight based on 100 parts by weight of the total sum of the components (C) and (D); and at least 10% by weight of a (B) glass fiber which is surface-treated with a coupling agent, said glass fiber being impregnated with the composition comprising the components (C), (D) and at lest one component selected from (E), (A) and (F), and having a length equal to the length of said pellet.

4. The styrenic resin pellet according to claim 3 wherein the content of said glass fiber is in the range of 30 to 80% by weight.

5. A molding made by molding the styrenic resin pellet as set forth in claim 1 wherein the content of the glass fiber having a length of at least 2 mm is at least 1% by weight based on the whole amount of the glass fiber.

6. A molding made by molding the styrenic resin pellet as set forth in claim 3 wherein the content of the glass fiber having a length of at least 2 mm is at least 1% by weight based on the whole amount of the glass fiber.

7. A molding made by molding the styrenic resin pellet as set forth in claim 1 along with a styrenic polymer having syndiotactic configuration or a styrenic polymer having syndiotactic configuration which is reinforced with short fibers, wherein the content of the glass fiber having a length of at least 2 mm is at least 1% by weight based on the whole amount of the glass fiber.

8. A molding made by molding the styrenic resin pellet as set forth in claim 3 along with a styrenic polymer having syndiotactic configuration or a styrenic polymer having syndiotactic configuration which is reinforced with short fibers, wherein the content of the glass fiber having a length of at least 2 mm is at least 1% by weight based on the whole amount of the glass fiber.

9. The styrenic resin pellet according to claim 1, wherein said polar group is at least one selected from the group consisting of acid halide, carbonyl group, acid anhydride, acid amide, carbonic acid ester, acid azide, sulfone group, nitrile group, cyano group, isocyanic acid ester group, amino group, hydroxyl group, imide group, thiol group, oxazoline group and epoxy group.

* * * * *